United States Patent
Levy-Israel et al.

(10) Patent No.: US 11,320,510 B2
(45) Date of Patent: May 3, 2022

(54) 2D ANGLE OF ARRIVAL ESTIMATION FOR STAGGERED ANTENNAE ARRAYS

(71) Applicant: GM Global Technology Operations LLC, Detroit, MI (US)

(72) Inventors: Moshe Levy-Israel, Ashdod (IL); Adi Panzer, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 262 days.

(21) Appl. No.: 16/522,231

(22) Filed: Jul. 25, 2019

(65) Prior Publication Data
US 2021/0025961 A1    Jan. 28, 2021

(51) Int. Cl.
*G01S 3/48*        (2006.01)
*G01S 13/931*      (2020.01)

(52) U.S. Cl.
CPC .............. *G01S 3/48* (2013.01); *G01S 13/931* (2013.01); *G01S 2013/9325* (2013.01)

(58) Field of Classification Search
None
See application file for complete search history.

(56) References Cited

U.S. PATENT DOCUMENTS

| | | | | |
|---|---|---|---|---|
| 2010/0039228 A1* | 2/2010 | Sadr | ................... | G06K 7/10366 340/10.1 |
| 2016/0009410 A1* | 1/2016 | Derenick | ............. | G08G 5/0069 701/17 |

* cited by examiner

*Primary Examiner* — Whitney Moore
(74) *Attorney, Agent, or Firm* — Cantor Colburn LLP

(57) ABSTRACT

Embodiments include methods, systems and computer readable storage medium for a method for resolving an angle of arrival (AOA) in an antennae array is disclosed. The method includes receiving, from an antenna array of a radar system, antennae data. The method further includes receiving, by the radar system, an iteration counter value. The method further includes calculating, by the radar system, an elevation estimation and an azimuth estimation based on the antennae data and iteration counter value. The method further includes generating, by the radar system, a plurality of hypotheses based on the elevation estimation and azimuth estimation. The method further includes selecting, by the radar system, a hypothesis from the plurality of hypotheses. The method further includes storing, by the radar system, the selected hypothesis.

20 Claims, 8 Drawing Sheets

2D ANGLE OF ARRIVAL ESTIMATION FOR STAGGERED ANTENNAE ARRAYS

INTRODUCTION

The subject disclosure relates to vehicles, and more particularly relates to methods and radar systems for vehicles.

Many vehicles being produced today utilize radar systems. For example, certain vehicles utilize radar systems to detect other vehicles, pedestrians, or other objects on a road on which the vehicle is travelling. Radar systems may be used in this manner, for example, in implementing automatic braking systems, adaptive cruise control, and avoidance features, among other vehicle features. Certain vehicle radar systems are multiple input, multiple output (MIMO) radar systems.

MIMO radar systems employ multiple antennas at a transmitter to transmit independent (orthogonal) waveforms and multiple antennas at a receiver to receive the radar echoes. In a "collocated" MIMO radar configuration, the antennas in both the transmitter and the receiver are spaced sufficiently close so that each antenna views the same aspect of an object such that a point target is assumed. In the MIMO receiver, a matched filter bank is used to extract the orthogonal waveform components. When the orthogonal signals are transmitted from different antennas, the echoes of each signal carry independent information about detected objects and the different propagation paths. Phase differences caused by different transmitting antennas along with phase differences caused by different receiving antennas can lead to ambiguity when determining angle measurements. Accordingly, it is desirable to obtain higher angular resolution for MIMO radars.

SUMMARY

In accordance with one or more embodiments, a method for resolving an angle of arrival (AOA) in an antennae array of a radar system is disclosed. The method includes receiving antennae data from the antenna array and receiving, by the radar system, an iteration counter value. The method also includes calculating, by the radar system, an elevation estimation and an azimuth estimation based on the antennae data and the iteration counter value. Further, the radar system generates a plurality of hypotheses based on the elevation estimation and the azimuth estimation, selects a hypothesis from the plurality of hypotheses, and stores the selected hypothesis.

In accordance with one or more embodiments or the method embodiment above, the antennae array can be staggered.

In accordance with one or more embodiments or any of the method embodiments above, the antennae array can utilize positive couples and negative couples.

In accordance with one or more embodiments or any of the method embodiments above, the method can include calculating a first phase difference between a first antenna element of the antennae array and a second antenna element of the antennae array associated with a positive couple. The method can also include calculating a second phase difference between a first antenna element of the antennae array and a second antenna element of the antennae array associated with a negative couple.

In accordance with one or more embodiments or any of the method embodiments above, the method can further include calculating and outputting speed information for a target.

In accordance with one or more embodiments or any of the method embodiments above, the selected hypothesis can be a hypothesis having a minimal distance to a previous azimuth estimation.

In accordance with one or more embodiments or any of the method embodiments above, the method can further include calculating an azimuth estimation distance using the iteration counter value.

In accordance with one or more embodiments, a system for resolving an angle of arrival (AOA) in an antennae array of a radar system is disclosed. The system includes a vehicle and the radar system. The vehicle includes a memory, a processor coupled to the memory. The radar system includes the antennae array having a plurality of antennae elements. The radar system is operable to receive antennae data, receive an iteration counter value, and calculate an elevation estimation and an azimuth estimation based on the antennae data and the iteration counter value. The radar system is also operable to generate a plurality of hypotheses based on the elevation estimation and the azimuth estimation, select a hypothesis from the plurality of hypotheses, and store the selected hypothesis.

In accordance with one or more embodiments or the system embodiment above, the antennae array can be staggered.

In accordance with one or more embodiments or any of the system embodiments above, the antennae array can utilize positive couples and negative couples.

In accordance with one or more embodiments or any of the system embodiments above, the radar system can be operable to calculate a first phase difference between a first antenna element of the antennae array and a second antenna element of the antennae array associated with a positive couple. The radar system can also be operable to calculate a second phase difference between a first antenna element of the antennae array and a second antenna element of the antennae array associated with a negative couple.

In accordance with one or more embodiments or any of the system embodiments above, the radar system can be operable to calculate and output speed information for a target.

In accordance with one or more embodiments or any of the system embodiments above, the selected hypothesis can be a hypothesis having a minimal distance to a previous azimuth estimation.

In accordance with one or more embodiments or any of the system embodiments above, the radar system can be operable to calculate an azimuth estimation distance using the iteration counter value.

In accordance with one or more embodiments, a non-transitory computer readable storage medium having program instructions for resolving an angle of arrival (AOA) in an antennae array of a radar system embodied therewith is disclosed. The program instructions are executable by a processor to cause operations including receiving antennae data, receiving an iteration counter value, and calculating an elevation estimation and an azimuth estimation based on the antennae data and the iteration counter value. The program instructions are also executable by a processor to cause operations including generating a plurality of hypotheses based on the elevation estimation and the azimuth estimation, selecting a hypothesis from the plurality of hypotheses, and storing the selected hypothesis.

In accordance with one or more embodiments or the non-transitory computer readable storage medium embodiment above, the antennae array can be staggered.

In accordance with one or more embodiments or any of the non-transitory computer readable storage medium embodiments above, the antennae array can utilize positive couples and negative couples.

In accordance with one or more embodiments or any of the non-transitory computer readable storage medium embodiments above, the program instructions can also be executable by the processor to cause operations including calculating a first phase difference between a first antenna element of the antennae array and a second antenna element of the antennae array associated with a positive couple. The program instructions can also be executable by the processor to cause operations including calculating a second phase difference between a first antenna element of the antennae array and a second antenna element of the antennae array associated with a negative couple.

In accordance with one or more embodiments or any of the non-transitory computer readable storage medium embodiments above, the program instructions can also be executable by the processor to cause operations including calculating and outputting speed information for a target.

In accordance with one or more embodiments or any of the non-transitory computer readable storage medium embodiments above, the selected hypothesis can be a hypothesis having a minimal distance to a previous azimuth estimation.

In accordance with one or more embodiments or any of the non-transitory computer readable storage medium embodiments above, the program instructions can also be executable by the processor to cause operations including calculating an azimuth estimation distance using the iteration counter value.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
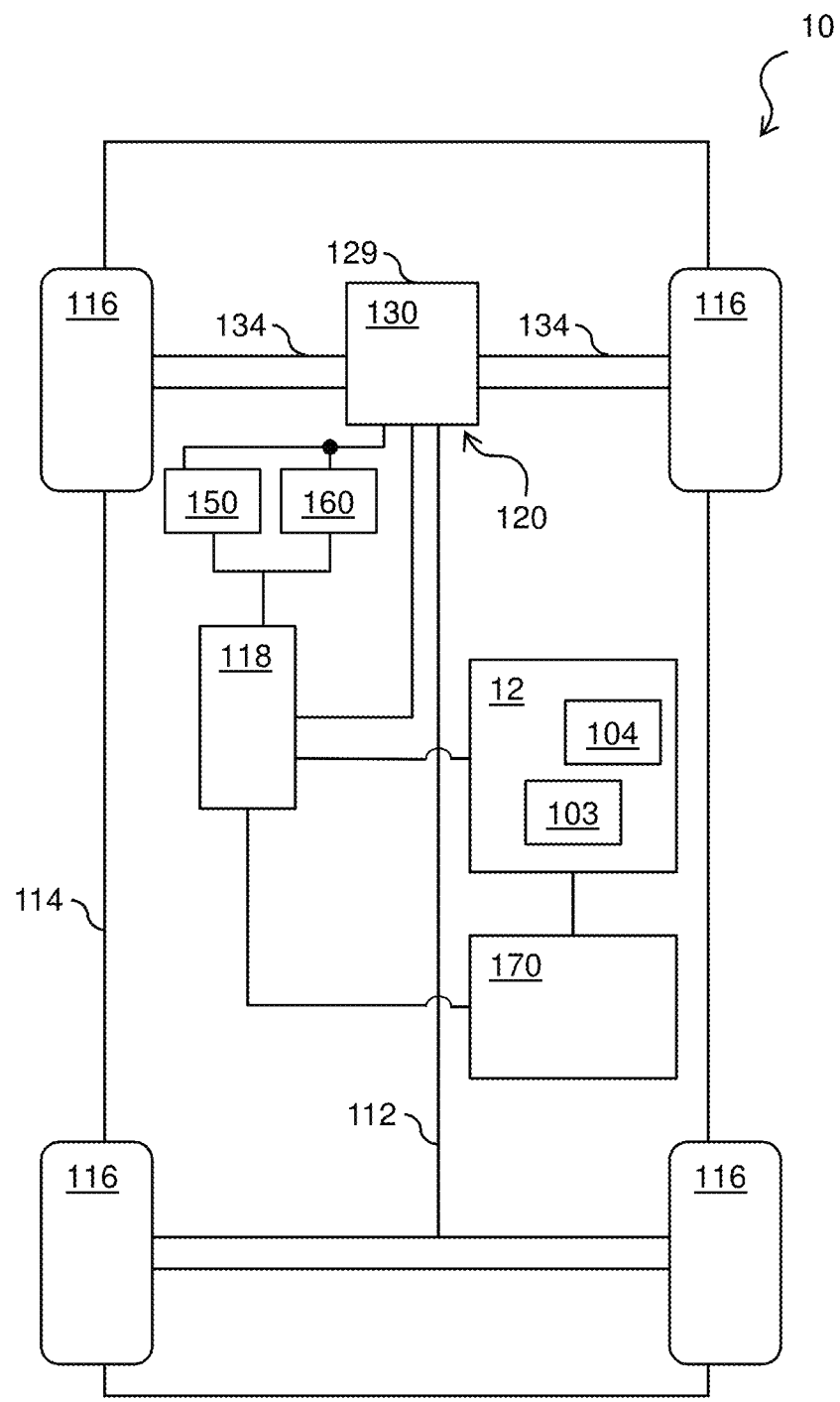
FIG. 1 is a block diagram of a vehicle having a control system, including a radar system according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Typically, a radar system estimates the angle to a target based on the phase difference between a received reflection and a common reference signal at each receiver. The phase difference experienced by each receiver may be used to refine the estimation of the angle to the target. Spacing corresponding with greater than half the wavelength of the common reference signal between the receivers results in phase differences experienced by each receiver differing by more than $\pi$. These result in ambiguity in the angle measurements obtained from the different receivers. Moreover, 2D uniform linear antennae array (ULA), the azimuth and elevation are coupled. Therefore, a 2D search of ($\theta$, $\varphi$) couples is required in order to resolve the azimuth and elevation of the target.

FIG. 1 provides a functional block diagram of vehicle 10, in accordance with an exemplary embodiment. As described in further detail greater below, the vehicle 10 includes a radar control system 12 having a radar system 103 and a controller 104 that classifies objects based upon a three dimensional representation of the objects using received radar signals of the radar system 103.

In the depicted embodiment, the vehicle 10 also includes a chassis 112, a body 114, four wheels 116, an electronic control system 118, a steering system 150, and a braking system 160. The body 114 is arranged on the chassis 112 and substantially encloses the other components of the vehicle 10. The body 114 and the chassis 112 may jointly form a frame. The wheels 116 are each rotationally coupled to the chassis 112 near respective corners of the body 114.

In the exemplary embodiment illustrated in FIG. 1, the vehicle 10 includes a powertrain 120. The powertrain 120 includes at least one propulsion system 129 mounted on the chassis 112 that drives the wheels 116. In the depicted embodiment, the powertrain 120 includes an engine 130. In one embodiment, the engine 130 comprises a combustion engine. In other embodiments, the powertrain 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is also mechanically coupled to a transmission. In other embodiments, the engine 130 may instead be coupled to a generator used to power an electric motor that is mechanically coupled to a transmission.

The steering system 150 is mounted on the chassis 112, and controls steering of the wheels 116. The steering system 150 includes a steering wheel and a steering column (not depicted). The steering wheel receives inputs from a driver of the vehicle 10.

The braking system 160 is mounted on the chassis 112, and provides braking for the vehicle 10. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle 10, as well as various other inputs for various vehicle devices and/or systems, such as one or more vehicle entertainment or infotainment systems, environmental control systems, lightning units, navigation systems, and the like (not depicted in FIG. 1).

Also as depicted in FIG. 1, in certain embodiments the vehicle 10 may also include a telematics system 170. In one such embodiment, the telematics system 170 is an onboard device that provides a variety of services through communication with a call center (not depicted) remote from the vehicle 10. In various embodiments, the telematics system may include, among other features, various non-depicted features such as an electronic processing device, one or more types of electronic memory, a cellular chipset/component, a wireless modem, a dual mode antenna, and a navigation unit containing a GPS chipset/component. In certain embodiments, certain of such components may be included in the controller 104, for example as discussed further below in connection with FIG. 2. The telematics system 170 may provide various services including: turn-by-turn directions and other navigation-related services provided in conjunction with the GPS chipset/component, airbag deployment notification and other emergency or roadside assistance-related services provided in connection with various sensors and/or sensor interface modules located throughout the vehicle, and/or infotainment-related services such as music, internet web pages, movies, television programs, videogames, and/or other content.

The radar control system 12 is mounted on the chassis 112. As mentioned above, the radar control system 12 classifies objects based upon a three dimensional representation of the objects using received radar signals of the radar system 103.

While the radar control system 12, the radar system 103, and the controller 104 are depicted as being part of the same system, it will be appreciated that in certain embodiments these features may comprise two or more systems. In addition, in various embodiments the radar control system 12 may comprise all or part of, and/or may be coupled to, various other vehicle devices and systems, such as, among others, the powertrain 120, and/or the electronic control system 118.

Figure 2:
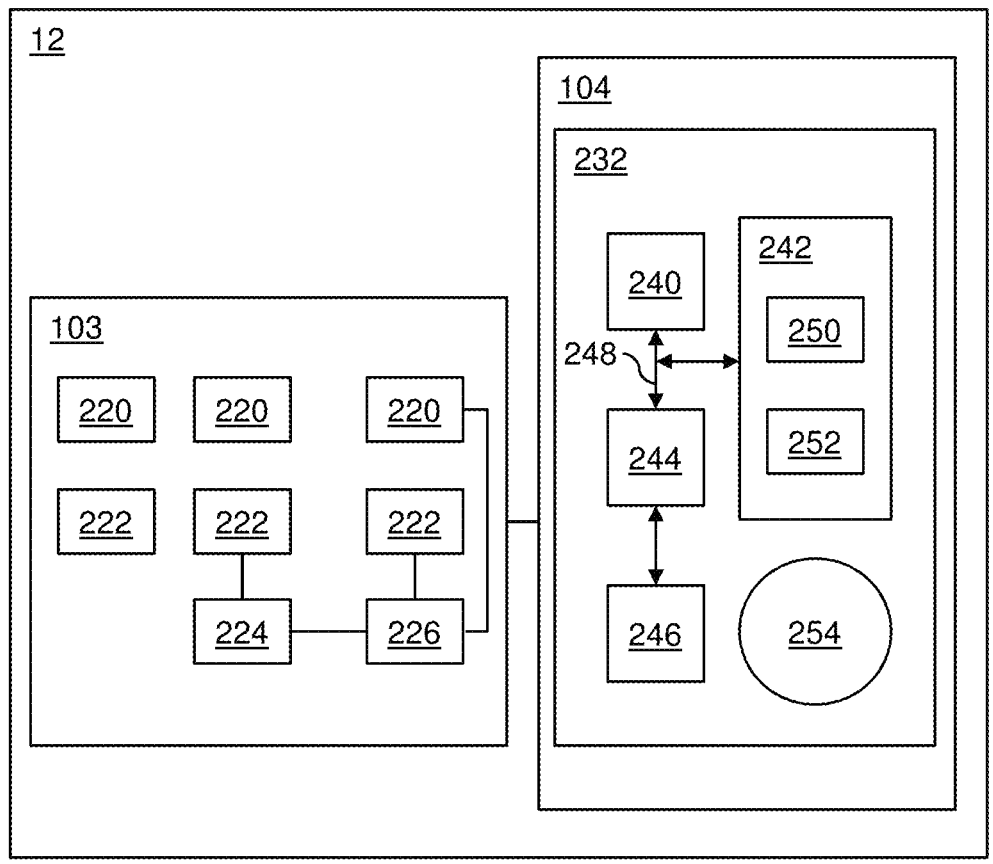
FIG. 2 is a block diagram of the control system of the vehicle of FIG. 1, including the radar system according to one or more embodiments.

With reference to FIG. 2, a functional block diagram is provided for the radar control system 12 of FIG. 1, in accordance with an exemplary embodiment. As noted above, the radar control system 12 includes the radar system 103 and the controller 104 of FIG. 1.

As depicted in FIG. 2, the radar system 103 is arranged as an array that includes one or more transmitters 220, one or more receivers 222, a memory 224, and a processing unit 226. In the depicted embodiment, the radar system 103 comprises a multiple input, multiple output (MIMO) radar system with multiple transmitters (also referred to herein as transmission channels (N)) 220 and multiple receivers (also referred to herein as receiving channels (M)) 222. The transmitters 220 transmit radar signals for the radar system 103. After the transmitted radar signals contact one or more objects on or near a road on which the vehicle 10 is travelling and is reflected/redirected toward the radar system 103, the redirected radar signals are received by the receivers 222 of the radar system 103 for processing.

Figure 3:
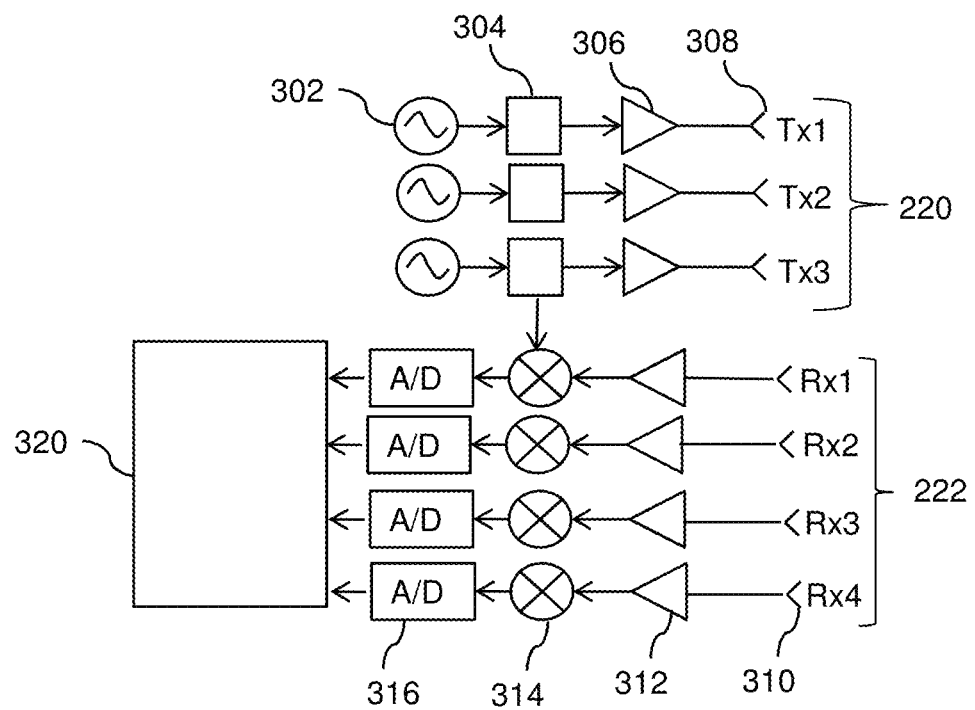
FIG. 3 is a block diagram of a transmission channel and a receiving channel of the radar system of FIGS. 1 and 2 according to one or more embodiments.

FIG. 3 depicts transmission channels 220 along with receiving channels 222 and processor 320 of the radar system 12, in accordance with an exemplary embodiment. Each transmitting channel 220 includes a signal generator 302, a filter 304, an amplifier 306, and an antenna 308. Also as depicted in FIG. 3, each receiving channel 222 includes an antenna 310, an amplifier 312, a mixer 314, and a sampler/digitizer 316. In certain embodiments the antennas 308, 310 may comprise a single antenna, while in other embodiments the antennas 308, 310 may comprise separate antennas. Similarly, in certain embodiments the amplifiers 306, 312 may comprise a single amplifier, while in other embodiments the amplifiers 306, 312 may comprise separate amplifiers. In addition, in certain embodiments multiple transmitting channels 220 may share one or more of the signal generators 302, filters 304, amplifiers 306, and/or antennae 308. Likewise, in certain embodiments, multiple receiving channels 222 may share one or more of the antennae 310, amplifiers 312, mixers 314, and/or samplers/digitizers 316. The processor 320 can control the array to select which channels to operate in each cycle.

The radar system 103 generates the transmittal radar signals via the signal generator(s) 302. The transmittal radar signals are filtered via the filter(s) 304, amplified via the amplifier(s) 306, and transmitted from the radar system 103 (and from the vehicle 10 to which the radar system 103 belongs, also referred to herein as the "host vehicle") via the antenna(e) 308. The transmitting radar signals subsequently contact other vehicles and/or other objects on or alongside the road on which the host vehicle 10 is travelling. After contacting the other vehicles and/or other objects, the radar signals are reflected, and travel from the other vehicles and/or other objects in various directions, including some signals returning toward the host vehicle 10. The radar signals returning to the host vehicle 10 (also referred to herein as received radar signals) are received by the antenna (e) 310, amplified by the amplifier(s) 312, mixed by the mixer(s) 314, and digitized by the sampler(s)/digitizer(s) 316.

Returning to FIG. 2, the radar system 103 also includes, among other possible features, the memory 224 and the processing unit 226. The memory 224 stores information received by the receiver 222 and/or the processing unit 226. In certain embodiments, such functions may be performed, in whole or in part, by a memory 242 of a computer system 232 (discussed further herein).

The processing unit 226 processes the information obtained by the receivers 222 for classification of objects based upon a three dimensional representation of the objects using received radar signals of the radar system 103. The processing unit 226 of the illustrated embodiment is capable of executing one or more programs (i.e., running software) to perform various tasks instructions encoded in the program(s). The processing unit 226 may include one or more microprocessors, microcontrollers, application specific integrated circuits (ASICs), or other suitable device as realized by those skilled in the art, such as, by way of example, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In certain embodiments, the radar system 103 may include multiple memories 224 and/or processing units 226, working together or separately, as is also realized by those skilled in the art. In addition, it is noted that in certain embodiments, the functions of the memory 224, and/or processing unit 226 may be performed in whole or in part by one or more other memories, interfaces, and/or processors disposed outside the radar system 103, such as the memory 242 and the processor 240 of the controller 104 described further below.

As depicted in FIG. 2, the controller 104 is coupled to the radar system 103. Similar to the discussion above, in certain embodiments the controller 104 may be disposed in whole or in part within or as part of the radar system 103. In addition, in certain embodiments, the controller 104 is also coupled to one or more other vehicle systems (such as the electronic control system 118 of FIG. 1). The controller 104 receives and processes the information sensed or determined from the radar system 103, provides detection, classification, and tracking of based upon a three dimensional representation of the objects using received radar signals of the radar system 103, and implements appropriate vehicle actions based on this information.

As depicted in FIG. 2, the controller 104 comprises the computer system 232. In certain embodiments, the controller 104 may also include the radar system 103, one or more components thereof, and/or one or more other systems. In addition, it will be appreciated that the controller 104 may otherwise differ from the embodiment depicted in FIG. 2. For example, the controller 104 may be coupled to or may otherwise utilize one or more remote computer systems and/or other control systems, such as the electronic control system 118 of FIG. 1.

The computer system 232 includes the processor 240, the memory 242, an interface 244, a storage device 246, and a bus 248. The processor 240 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. In one embodiment, the processor 240 classifies objects using radar signal spectrogram data in combination with one or more computer vision models. During operation, the processor 240 executes one or more programs 250 contained within the memory 242 and, as such, controls the general operation of the controller 104 and the computer system 232.

The memory 242 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 242 is located on and/or co-located on the same computer chip as the processor 240. In the depicted embodiment, the memory 242 stores the referenced programs 250 along with one or more stored values 252 (such as, by way of example, information from the received radar signals and the spectrograms therefrom).

The bus 248 serves to transmit programs, data, status and other information or signals between the various components of the computer system 232. The interface 244 allows communication to the computer system 232, for example from a system driver and/or another computer system, and can be implemented using any suitable method and apparatus. The interface 244 can include one or more network interfaces to communicate with other systems or components. In one embodiment, the interface 244 includes a transceiver. The interface 244 may also include one or more network interfaces to communicate with technicians, and/or one or more storage interfaces to connect to storage apparatuses, such as the storage device 246.

The storage device 246 can be any suitable type of storage apparatus, including direct access storage devices such as hard disk drives, flash systems and optical disk drives. In one exemplary embodiment, the storage device 246 comprises a program product from which memory 242 can receive a program 250 that executes one or more embodiments of one or more processes of the present disclosure. In another exemplary embodiment, the program product may be directly stored in and/or otherwise accessed by the memory 242 and/or a disk (e.g., disk 254).

The bus 248 can be any suitable physical or logical means of connecting computer systems and components. This includes, but is not limited to, direct hard-wired connections, fiber optics, infrared and wireless bus technologies. During operation, the program 250 is stored in the memory 242 and executed by the processor 240.

It will be appreciated that while this exemplary embodiment is described in the context of a fully functioning computer system, those skilled in the art will recognize that the embodiments described herein are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 240) to perform and execute the program. Such a program product may take a variety of forms, and the present disclosure applies equally regardless of the particular type of computer-readable signal bearing media used to carry out the distribution. Examples of signal bearing media include: recordable media such as hard drives, memory cards and optical disks, and transmission media such as digital and analog communication links. It will similarly be appreciated that the computer system 232 may also otherwise differ from the embodiment depicted in FIG. 2, for example in that the computer system 232 may be coupled to or may otherwise utilize one or more remote computer systems and/or other control systems.

Figure 4A:
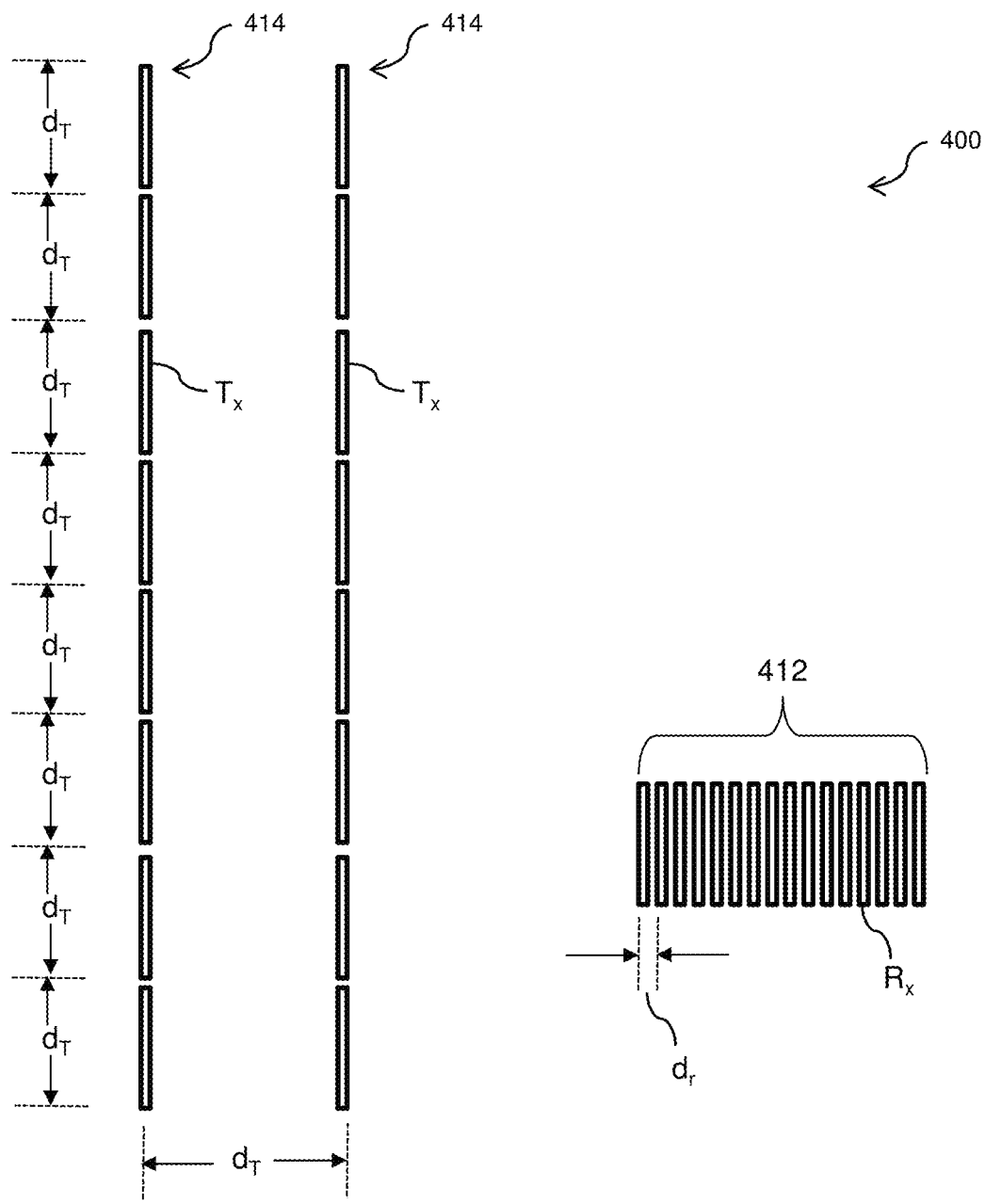
FIG. 4A depicts a known MIMO antennae array configuration.

FIG. 4A depicts a known MIMO array 400. If the spacing $d_R$ between receiver $R_x$ antenna elements in the receive array 412 is a half-wavelength (½λ), the spacing $d_T$ between the transmitter $T_x$ antenna elements in the transmit array 414 must be $N_{Rx}d_R$ to maintain uniform spacing in the virtual array 416, where $N_{Rx}$ is the number of receiver antennas. The inverse spatial relationship (not shown) also applies when the spacing $d_T$ between the transmitter $T_x$ antenna elements in the transmit array is a ½λ thereby maintaining a uniform virtual array. The spacing $d_R$ between receiver $R_x$ antenna elements in the receive array must be $N_{Tx}d_T$, wherein $N_{tx}$ the number of transmitter $T_x$ antenna elements.

Figure 4B:
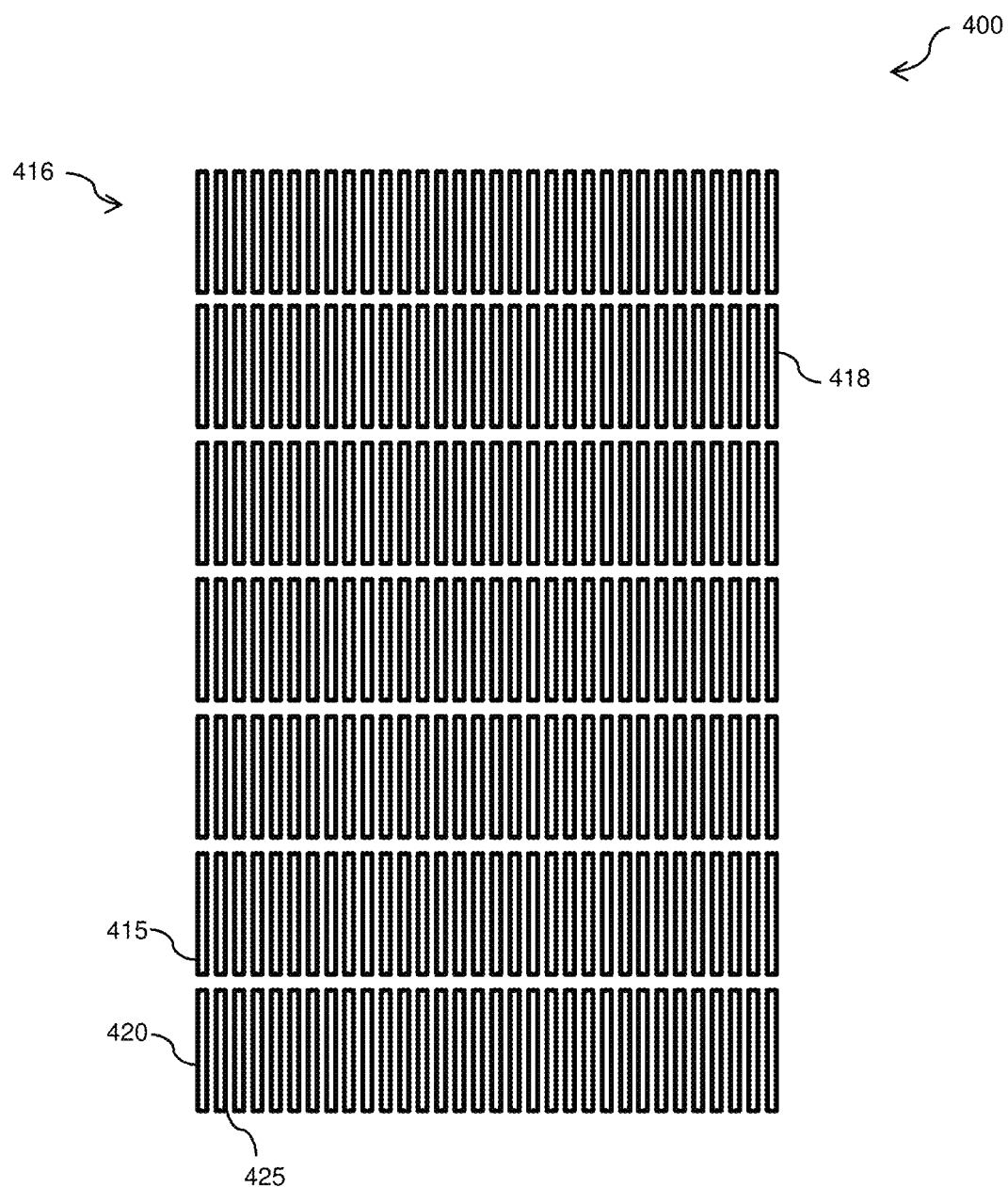
FIG. 4B depicts a virtual antennae array resulting from the MIMO antennae array of FIG. 4A.

MIMO antenna configuration 400 has a uniformly spaced receiver antenna array 412 extending linearly along a horizontal axis and two parallel transmit antenna arrays 414 extending along a vertical axis. The receiver antenna array 412 includes $N_{Rx}$ receiver antennas $R_x$ uniformly spaced apart by a distance $d_R$, and the two transmit antenna arrays 414 that include $N_{tx}$ transmitter antennas $T_x$, wherein the transmitter antennas $T_x$ are spaced apart by a distance $d_T$ in the horizontal and vertical axes. In this particular example, the number of receiver antennas $N_R$, and the number of transmitter antennas $N_t$, are both equal to 16, the distance $d_R$ between the receiver antennas $R_x$ is 0.5λ, and the distance $d_T$ between the transmit antenna arrays 414 is $N_{Rx}d_R$. The distance $d_T$ between the transmitter antennas $T_x$ is chosen to be $N_{Rx}d_R$ so that the resulting virtual array 416 has uniformly spaced elements at a distance $d_R$. As shown in FIG. 4B, the uniform virtual array 416 having $N_{tx}N_{Rx}$ virtual antenna elements 418 resulting from the antenna array 400 produces a large virtual aperture providing a high angular resolution in both dimensions and has a uniform spacing in the horizontal axis and vertical axis. However, because the vertical axis spacing $d_T$ between the transmitter antennas $T_x$ is much larger than $0.5\lambda$, ambiguities arise due to grating lobes in elevation, and thus, the 3-dimensional spatial beam pattern of the virtual array 416 produced by the known antenna configuration is not optimal.

Virtual array 416 can be arranged as a two-dimensional (2D) uniform linear array. Accordingly, an angle of arrival (AOA) estimation for virtual array 416 can be performed by averaging the phase difference between antenna elements. The phase between antenna elements along a vertical axis (e.g., element 415 and element 420), which are spaced by a distance of $0.5\lambda$ can be calculated, can be calculated according to Equation 1, where θ is an azimuth angle and φ is an elevation angle:

$$\Delta_{ij}=\pi \sin\theta \cos\varphi \qquad \text{Equation 1}$$

The phase between antenna elements along a horizontal axis (e.g., element 420 and element 425), which are spaced by a distance of $0.5\lambda$, can be calculated according to Equation 2:

$$\Delta_{ij}=\pi \sin\varphi \cos\theta \qquad \text{Equation 2}$$

Figure 5A:
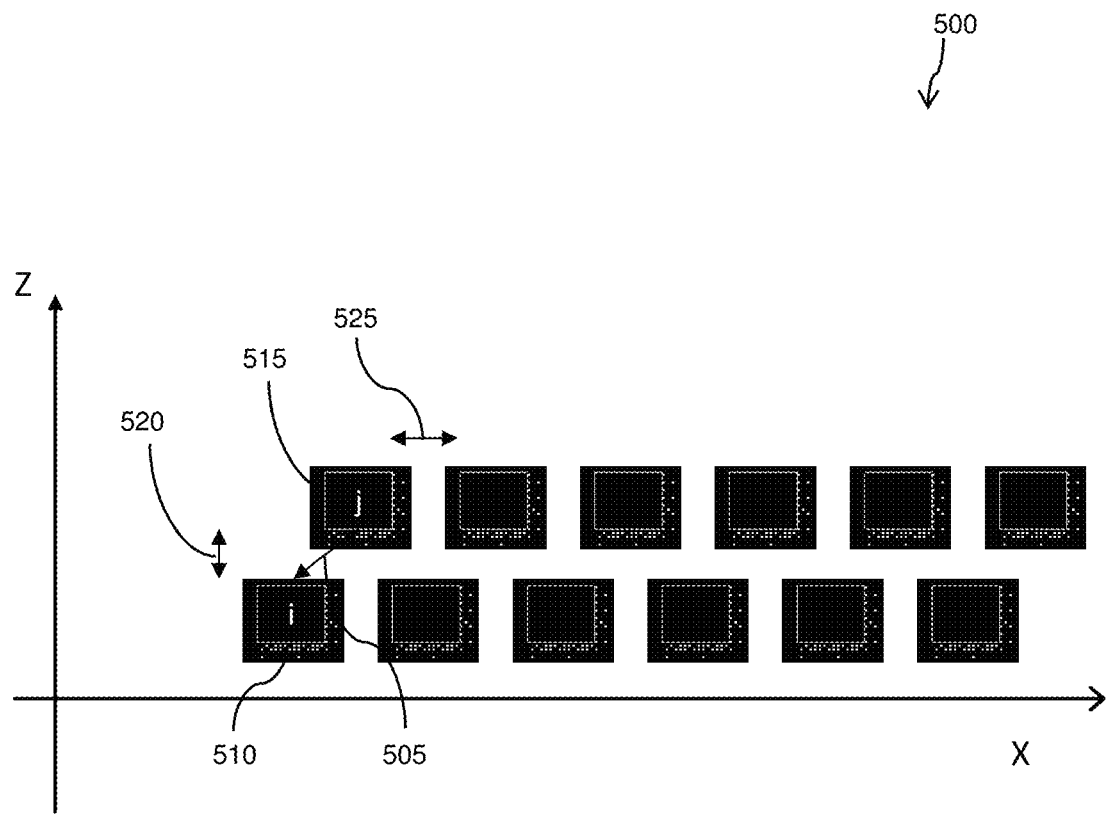
FIG. 5A depicts a virtual antennae array according to one or more embodiments.

FIG. 5A illustrates a virtual array 500 having $N_{Tx}N_{Rx}$ virtual antenna elements according to one or more embodiments. The virtual array 500 can include a receiver antenna array and transmit antenna array similar to MIMO antenna configuration 400.

In contrast to the virtual array 416, virtual array 500 is a staggered array (i.e., one or more rows in the staggered array are shifted left or right a predetermined distance) thereby increasing the virtual aperture while utilizing the same number of antenna elements. The phase difference ($\Delta_{ij}$) 505 between two antenna elements 510 and 515 of virtual array 500 can be calculated according to Equation 3, where θ is the azimuth angle and φ is the elevation angle (e.g., using differences 520 and 525):

$$\Delta_{ij}=\pi(\sin(\theta)\cos(\varphi)+\sin(\varphi)) \qquad \text{Equation 3}$$

Figure 5B:
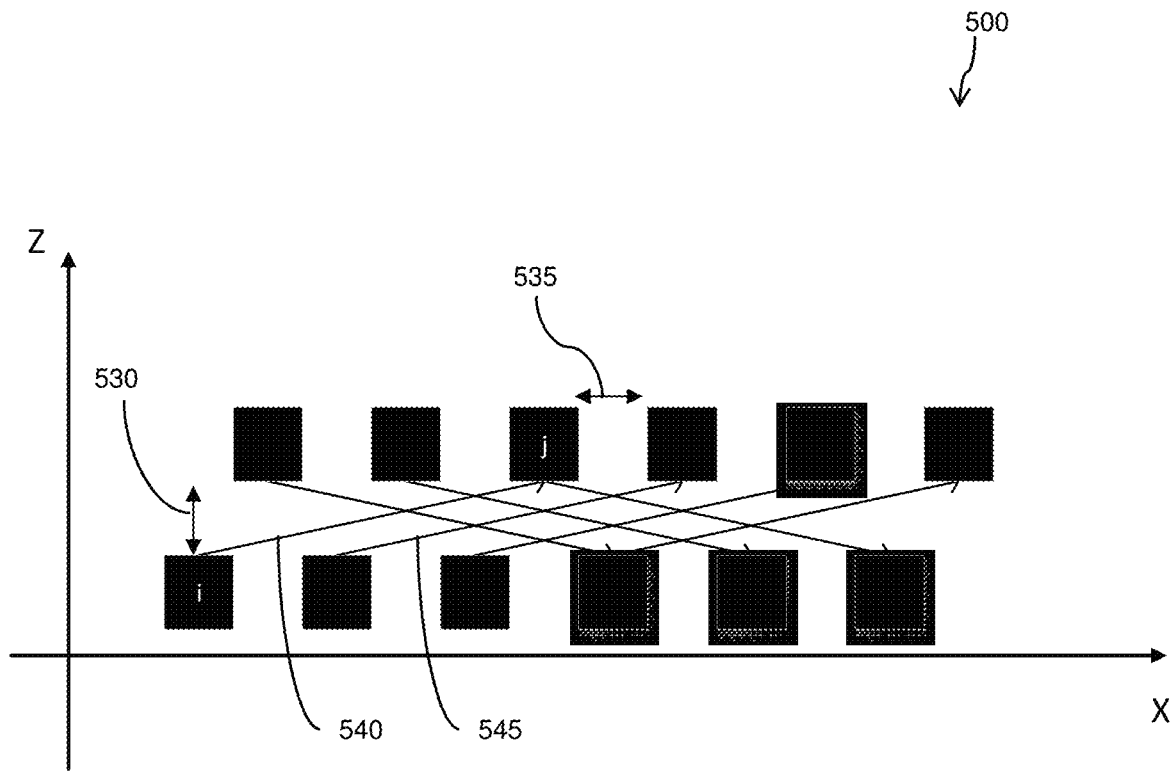
FIG. 5B depicts positive and negative coupling associated with the virtual antennae array of FIG. 5A according to one or more embodiments.

FIG. 5B illustrates the virtual array 500 including positive and negative coupling antennae elements according to one or more embodiments. A distance vertically 530 between antenna elements from row to row can be $0.5\lambda$. An azimuth distance 535, between the antenna pairs in a row can be a multiple of $0.5\lambda$ (e.g., $0.5\lambda$, $\lambda$, $1.5\lambda$, etc.). To reduce compute complexity due to azimuth and elevation coupling, the virtual array 500 can utilize positive φ couples i,j 540 and negative φ couples u,v 545. Accordingly, a phase difference δ can be calculated according to Equations 4 and 5 for positive coupling 540 and according to Equations 6 and 7 for negative coupling 545:

$$\delta_{ij}(\theta,\varphi)=\pi(\sin(\theta)\cos(\varphi)+\sin(\varphi)) \qquad \text{Equation 4}$$

$$\Delta_{p\text{-}type}=\Sigma_{i,j\ couples}\delta_{ij} \qquad \text{Equation 5}$$

$$\delta_{ij}(\theta,\varphi)=\pi(\sin(\theta)\cos(\varphi)+\sin(\varphi)) \qquad \text{Equation 6}$$

$$\Delta_{n\text{-}type}=\Sigma_{u,v\ couples}\delta_{uv} \qquad \text{Equation 7}$$

Elevation ($\hat{\theta}_{El}$) can be estimated according to Equations 8 and 9:

$$2\sin(\theta_{El}) = \Delta_{p\text{-}type} - \Delta_{n\text{-}type} \qquad \text{Equation 8}$$

$$\hat{\theta}_{El} = \sin^{-1}\left(\frac{\Delta_{p\text{-}type} - \Delta_{n\text{-}type}}{2}\right) \qquad \text{Equation 9}$$

For a given $\hat{\theta}_{El}$, azimuth ($\hat{\theta}_{Az}$) can be estimated according to Equation 10:

$$\hat{\theta}_{Az} = \sin^{-1}\left(\frac{\Delta_{p\text{-}type} - \sin(\hat{\theta}_{El})}{\pi\cos(\hat{\theta}_{El})}\right) \qquad \text{Equation 10}$$

In instances where the selected azimuth distance is greater than $0.5\lambda$, ambiguity will be introduced leading to several $\hat{\theta}_{Az}$ hypotheses. Accordingly, the number of the hypotheses (K) is $2d/\lambda$, where d is a selected azimuth distance.

An AOA estimation module (not shown) of radar system 103 can utilize antenna data from antennae in the virtual array 500 along with an azimuth distance for given antenna pairs to calculate and output elevation and azimuth estimations. The output elevation and azimuth estimations can be determined. according to Expression 1:

$$\hat{\theta}_{El},[\hat{\theta}_{Az_1}\hat{\theta}_{Az_2}\ldots\hat{\theta}_{Az_k}] \qquad \text{Expression 1}$$

Figure 6:
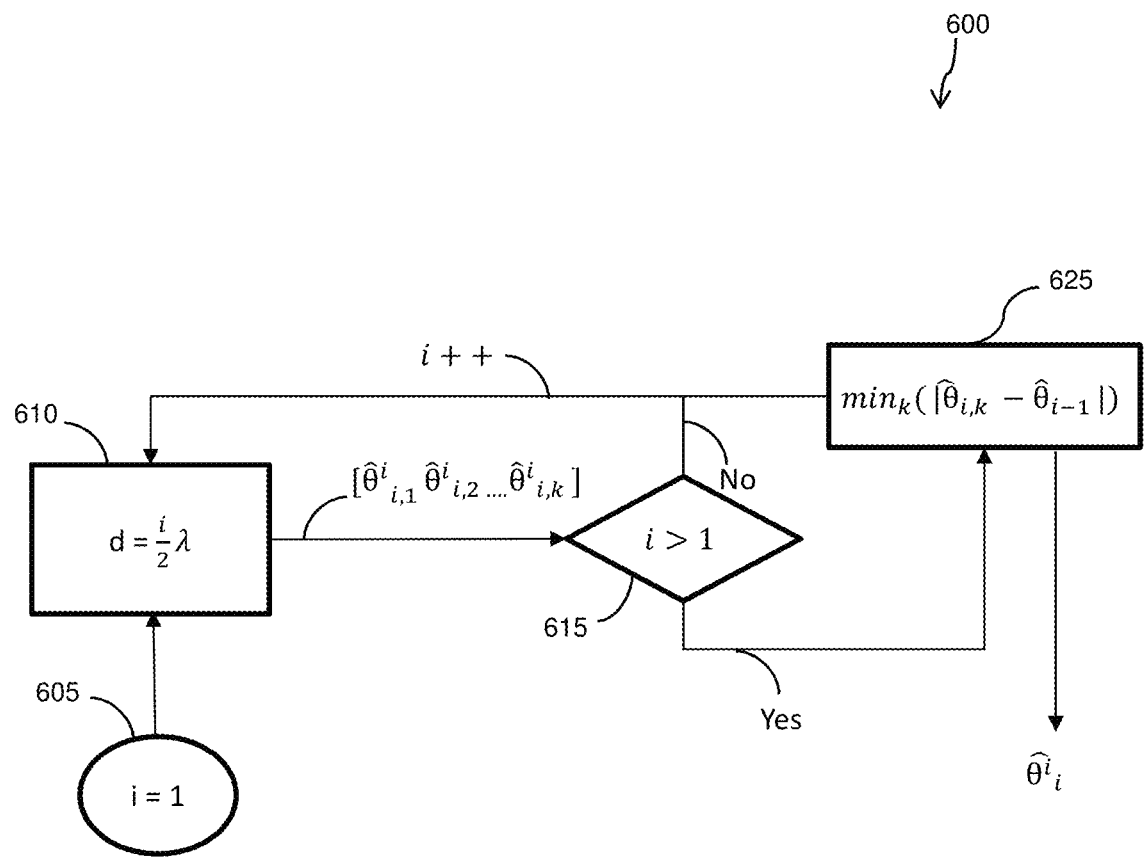
FIG. 6 depicts a flow chart for resolving angle of arrival (AOA) in an array according to one or more embodiments.

FIG. 6 depicts a flow chart 600 for resolving angle of arrival (AOA) in an array according to one or more embodiments. At circle 605, a radar system (e.g., radar system 103) can send an iteration counter value (e.g., 1) to an AOA estimation module of the radar system.

The AOA estimation module also receives antenna data from a plurality of antennae of a virtual antenna array (e.g., virtual array 500). At block 610, the AOA estimation module can calculate and output an AOA estimation based on the received iteration counter value (i) and antenna data. The AOA estimation module can estimate the AOA using all antenna couples and an azimuth distance, which is incremented by the iteration counter value according to Equation 11:

$$d_i = \frac{i}{2}\lambda \qquad \text{Equation 11}$$

At decision diamond 615, the radar system can determine if the iteration counter value is greater than 1. If the iteration counter value is greater than 1, the flow chart 600 proceeds to block 625 as indicated by the Yes arrow. At 625, the radar system can generate a plurality of hypotheses for azimuth estimations. The radar system can resolve the AOA by selecting and outputting a hypothesis having a minimal distance to a previous azimuth estimation. The selected hypothesis can be used to calculate the azimuth estimation. The radar system can use the azimuth estimation to calculate and store an estimated Doppler frequency and/or an output location/distance and speed information for a target using the selected hypothesis, which can be displayed and/or used by a vehicle for a variety of applications, (e.g., collision avoidance). The radar system can also increment the iteration counter value (i) and send the incremented iteration counter value (i++) to the AOA estimation module which can calculate and output an AOA estimation based on the incremented iteration counter value (i++) and antenna data.

If the iteration counter value is less than 1, the flow chart 600 proceeds to block 610 as indicated by the No arrow. The radar system can also increment the iteration counter value (i) and send the incremented iteration counter value (i++) to the AOA estimation module which can calculate and output an AOA estimation based on the incremented iteration counter value (i++) and antenna data. Accordingly, the recited process can be iteratively repeated when the iteration counter value is incremented.

Accordingly, the embodiments disclosed herein describe a system that can resolve an AOA using an iterative 2D AOA estimation to exploit aspects of a staggered virtual array structure of an antennae array that enables Doppler ambiguity resolution in time-division multiple-access (TDMA) MIMO radars having manufacturing errors using a short calibration process. The system also can provide an AOA estimation for non-orthogonal arrays that decouples azimuth from elevation.

Technical effects and benefits of the disclosed embodiments include, but are not limited to reducing compute complexity due to azimuth and elevation coupling, decoupling azimuth from elevation in a 2D staggered array, implementing an AOA estimation approach that is less sensitive to the manufacturing errors, as well as providing a AOA estimation approach requiring a shorter calibration time.

The present disclosure may be a system, a method, and/or a computer readable storage medium. The computer readable storage medium may include computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed:

1. A method for resolving an angle of arrival (AOA) in an antennae array of a radar system, the method comprising:
   receiving antennae data from the antenna array;
   receiving, by the radar system, an iteration counter value;
   calculating, by the radar system, an elevation estimation and an azimuth estimation based on the antennae data and the iteration counter value;
   generating, by the radar system, a plurality of hypotheses based on the elevation estimation and the azimuth estimation;
   selecting, by the radar system, a hypothesis from the plurality of hypotheses; and
   storing, by the radar system, the selected hypothesis.

2. The method of claim 1, wherein the antennae array is staggered.

3. The method of claim 2, wherein the antennae array utilizes positive couples and negative couples.

4. The method of claim 3, the method further comprising:
   calculating a first phase difference between a first antenna element of the antennae array and a second antenna element of the antennae array associated with a positive couple; and
   calculating a second phase difference between a first antenna element of the antennae array and a second antenna element of the antennae array associated with a negative couple.

5. The method of claim 1, the method further comprising calculating and outputting speed information for a target.

6. The method of claim 1, wherein the selected hypothesis is a hypothesis having a minimal distance to a previous azimuth estimation.

7. The method of claim 1, the method further comprising calculating an azimuth estimation distance using the iteration counter value.

8. A system for resolving an angle of arrival (AOA) in an antennae array of a radar system, the system comprising:
   a vehicle comprising:
      a memory;
      a processor coupled to the memory; and
      the radar system comprising the antennae array having a plurality of antennae elements;
      wherein the radar system is operable to:
         receive antennae data;
         receive an iteration counter value;
         calculate an elevation estimation and an azimuth estimation based on the antennae data and the iteration counter value;
         generate a plurality of hypotheses based on the elevation estimation and the azimuth estimation;
         select a hypothesis from the plurality of hypotheses; and
         store the selected hypothesis.

9. The system of claim 8, wherein the antennae array is staggered.

10. The system of claim 9, wherein the antennae array utilizes positive couples and negative couples.

11. The system of claim 10, wherein the radar system is further operable to:
- calculate a first phase difference between a first antenna element of the antennae array and a second antenna element of the antennae array associated with a positive couple; and
- calculate a second phase difference between a first antenna element of the antennae array and a second antenna element of the antennae array associated with a negative couple.

12. The system of claim 8, wherein the radar system is further operable to calculate and output speed information for a target.

13. The system of claim 12, wherein the selected hypothesis is a hypothesis having a minimal distance to a previous azimuth estimation.

14. The system of claim 8, wherein the radar system is further operable to calculate an azimuth estimation distance using the iteration counter value.

15. A non-transitory computer readable storage medium having program instructions for resolving an angle of arrival (AOA) in an antennae array of a radar system embodied therewith, the program instructions executable by a processor to cause operations comprising:
- receiving antennae data;
- receiving an iteration counter value;
- calculating an elevation estimation and an azimuth estimation based on the antennae data and the iteration counter value;
- generating a plurality of hypotheses based on the elevation estimation and the azimuth estimation;
- selecting a hypothesis from the plurality of hypotheses; and
- providing the selected hypothesis to control an operation of a vehicle that includes the radar system.

16. The computer readable storage medium of claim 15, wherein the antennae array is staggered.

17. The computer readable storage medium of claim 16, wherein the antennae array utilizes positive couples and negative couples.

18. The computer readable storage medium of claim 17, the program instructions further executable by the processor to cause operations comprising:
- calculating a first phase difference between a first antenna element of the antennae array and a second antenna element of the antennae array associated with a positive couple; and
- calculating a second phase difference between a first antenna element of the antennae array and a second antenna element of the antennae array associated with a negative couple.

19. The computer readable storage medium of claim 18, further comprising calculating an azimuth estimation distance using the iteration counter value.

20. The computer readable storage medium of claim 15, wherein the selected hypothesis is a hypothesis having a minimal distance to a previous azimuth estimation.

* * * * *